United States Patent
Arai et al.

[11] Patent Number: 5,944,256
[45] Date of Patent: Aug. 31, 1999

[54] AIR CONDITIONER FOR VEHICLE

[75] Inventors: Masashi Arai, Isehara; Makoto Fukubayashi, Hadano; Nobuyuki Kawai, Fujisawa, all of Japan

[73] Assignee: Nissan Motor Co., Ltd., Yokohama, Japan

[21] Appl. No.: 08/653,273

[22] Filed: May 23, 1996

[30] Foreign Application Priority Data

May 23, 1995 [JP] Japan .................................... 7-123890
May 23, 1995 [JP] Japan .................................... 7-123891

[51] Int. Cl.$^6$ .................................. G05B 11/01; G05D 23/32
[52] U.S. Cl. .......................... 236/49.3; 62/158; 236/91 C; 364/177
[58] Field of Search .................. 236/78 D, 91 C, 236/49.3; 62/158; 364/177

[56] References Cited

U.S. PATENT DOCUMENTS

| | | | |
|---|---|---|---|
| 3,500,898 | 3/1970 | Gerhart, Jr. et al. | 236/78 D |
| 3,594,557 | 7/1971 | Anderson | 364/177 |
| 5,088,298 | 2/1992 | Fujii | 62/228.5 |
| 5,240,178 | 8/1993 | Dewolf et al. | 236/78 D |
| 5,485,367 | 1/1996 | Hiroi | 364/177 X |
| 5,532,925 | 7/1996 | Gassman | 364/177 |

FOREIGN PATENT DOCUMENTS

| | | | |
|---|---|---|---|
| 0034915 | 2/1984 | Japan | 236/91 C |
| 0011049 | 1/1985 | Japan | 236/78 D |

*Primary Examiner*—William Wayner
*Attorney, Agent, or Firm*—Foley & Lardner

[57] ABSTRACT

A vehicular air conditioner comprises a controller, a solar sensor and a room temperature sensor. The controller includes a correcting section where a detected solar intensity and/or a detected room temperature is corrected by a first-order lag filtering process. The controller executes an air conditioning control on the basis of the corrected solar intensity and/or room temperature so that the change of the air-conditioning state is fitted in accordance with feeling of vehicle occupants.

21 Claims, 8 Drawing Sheets

AIR CONDITIONER FOR VEHICLE

BACKGROUND OF THE INVENTION

The present invention relates to improvements in an air conditioner for a vehicle, and more particularly to an air conditioner which executes an air-conditioning control upon taking into consideration various factors affecting an air-conditioned circumstance.

Various air conditioners for vehicles have been proposed and in practical use. A typical air conditioner for a vehicle is arranged to execute an air-conditioning control upon taking into consideration a solar intensity and/or feedbacking a room temperature detected although it is further desired to take into consideration feelings of man. Generally, man is not immediately so sensitive as to the change of the solar intensity. For example, when the solar intensity is radically increased, man generally feels the increase with a short time-lag. On the other hand, when the solar intensity is radically decreased, man generally feels the degree of such decrease more slowly than the actual changing speed. Further, man feels the change of the temperature with a predetermined time lag, and the following ability of the room temperature sensor with respect to the average room temperature becomes different according to an installed position of the sensor and according to the difference between the ambient temperature and the room temperature. Therefore, if the conventional air conditioner executes the air-conditioning operation without considering the above-mentioned man's feeling and the characteristics of the room temperature sensor, the air-conditioned state obtained by the conventional air-conditioning operation may be discomforting to the man.

SUMMARY OF THE INVENTION

It is an object of the present invention to provide an improved vehicular air conditioner which smoothly executes the change of the air-conditioning state affected by the change of the room circumstance without generating discomfort to vehicle occupants.

An air conditioner according to the present invention is for a vehicle and comprises a detecting section, a correcting section and a control section. The detecting section detects a quantity of a parameter which affects an air conditioning circumstance for a passenger compartment in the vehicle. The correcting section corrects the detected parameter on the basis of a change of the parameter. The control section executes an air conditioning control on the basis of the corrected parameter.

BRIEF DESCRIPTION OF THE DRAWINGS

In the drawings, like reference numeral designate like parts and elements throughout all figures, in which.

DETAILED DESCRIPTION OF THE INVENTION

Referring to FIGS. 1 to 6, there is shown a first embodiment of an air conditioner for a vehicle in accordance with the present invention.

Figure 1:
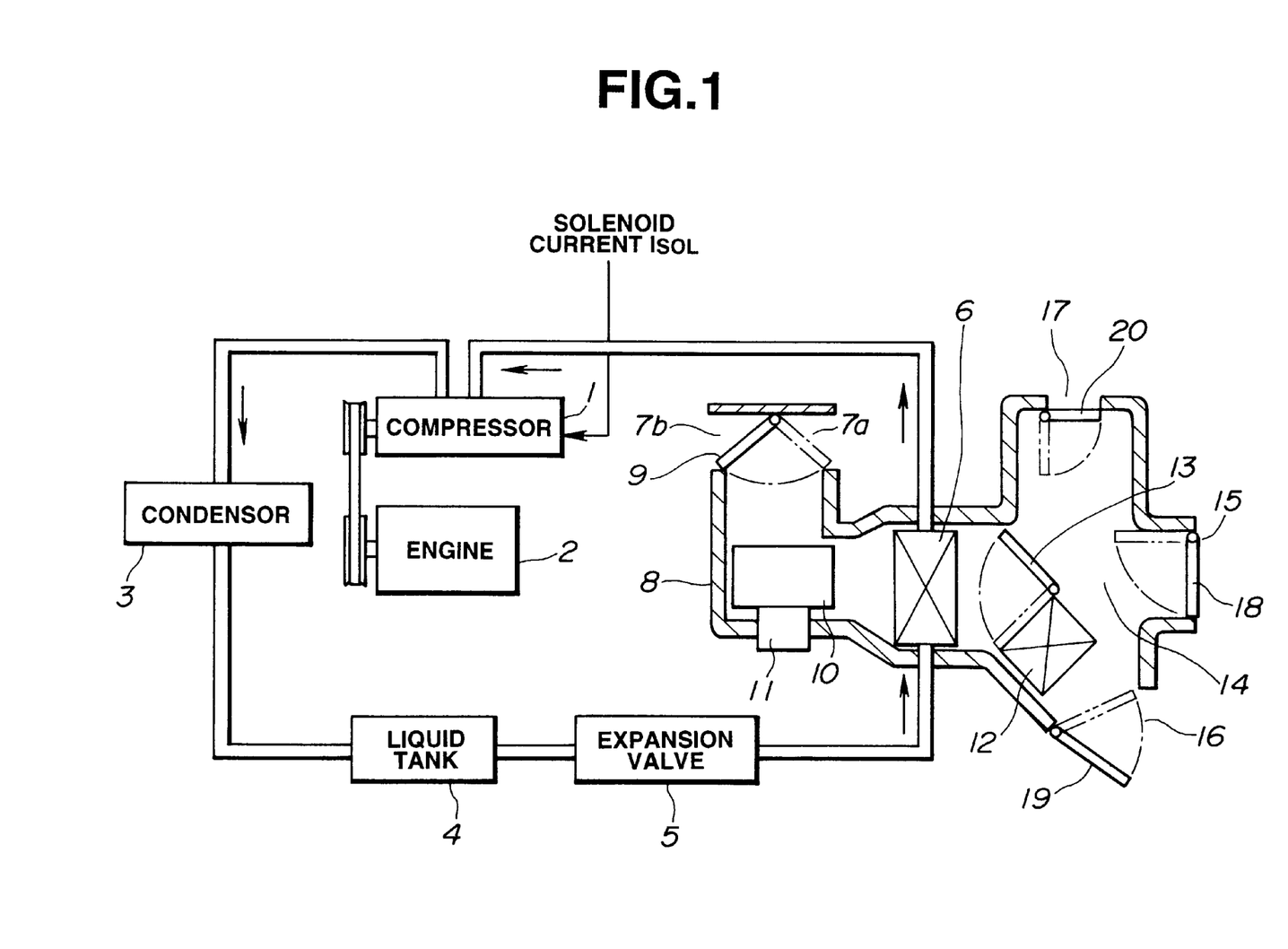
FIG. 1 is a schematic view of a vehicular air-conditioner of a first embodiment according to the present invention.

As shown in FIG. 1, a compressor 1 is driven by an engine 2 of the vehicle. The compressor 1 is of a variable displacement type which is arranged to increase a discharge amount by increasing an oblique angle when intake pressure becomes greater than a preset pressure. The preset pressure of the compressor 1 is controlled by a solenoid current $I_{SOL}$ supplied from a controller 68 shown in FIG. 2. A conventional constant displacement type compressor may be used as a compressor of this embodiment. Refrigerant pressurized by and discharged from the compressor 1 is supplied to a condenser 3 for liquidizing the refrigerant which is in high-temperature gas state due to the compression by the compressor 1. The condenser 3 is connected with a liquid tank 4. The refrigerant stored in the liquid tank 4 is expanded through an expansion valve 5 and supplied to an evaporator 6. The evaporator 6 executes a heat-transfer (exchange) between the refrigerant and air to be supplied to a passenger compartment of the vehicle. The evaporator 6 is connected with the compressor 1 to form closed circuit of the refrigerant in order to continuously execute the refrigeration cycle. The air to be cooled is supplied into the air-conditioning duct 8 from an outside air inlet 7a and an inside air inlet 7b by a blower fan 10 driven by a blower motor 11. An inside-and-outside air switching door (intake door) 9 is disposed at a portion between the outside air inlet 7a and the inside air inlet 7b so as to control the air flow amount from the outside air inlet 7a and the inside air inlet 7b to the air conditioning duct 8. The blower fan 10 rotated by drive force of the blower motor executes a ventilation in the air conditioning duct 8.

The air-conditioning duct 8 defines an air mix chamber 14 at a downstream portion of the evaporator 6. A heater core 12 is disposed downstream of the evaporator 6 and in the air mix chamber 14 to heat the air cooled by the evaporator 6. An air mix door 13 is disposed between the heater core 12 and the evaporator 6. The air mix door 13 is opened and closed by means of an actuator (not shown) to control a ratio between the air passing through the heater core 12 and the air bypassing the heater core 12. That is, according to the opening degree of the air mix door 13, part of the air cooled by the evaporator 6 passes through the heater core 12 to be warmed. The other air cooled by the evaporator 6 bypasses the heater core 12 without being heated by the heater core 12.

The air passed through the air mix door 13 and the heater core 12 is supplied to the air mix chamber 14. In the air mix chamber 14, a ventilator port 15 for blowing out conditioned air to an upper body of vehicle occupants, a foot port 16 for blowing out conditioned air to foot portions of the vehicle occupants, and a defroster port 17 for blowing-out the conditioned air to a window shield (not shown) are disposed. A ventilator door 18, a foot door 19 and a defroster door 20 are disposed to the ventilator port 15, the foot port 16 and the defroster port 17, respectively.

Figure 2:
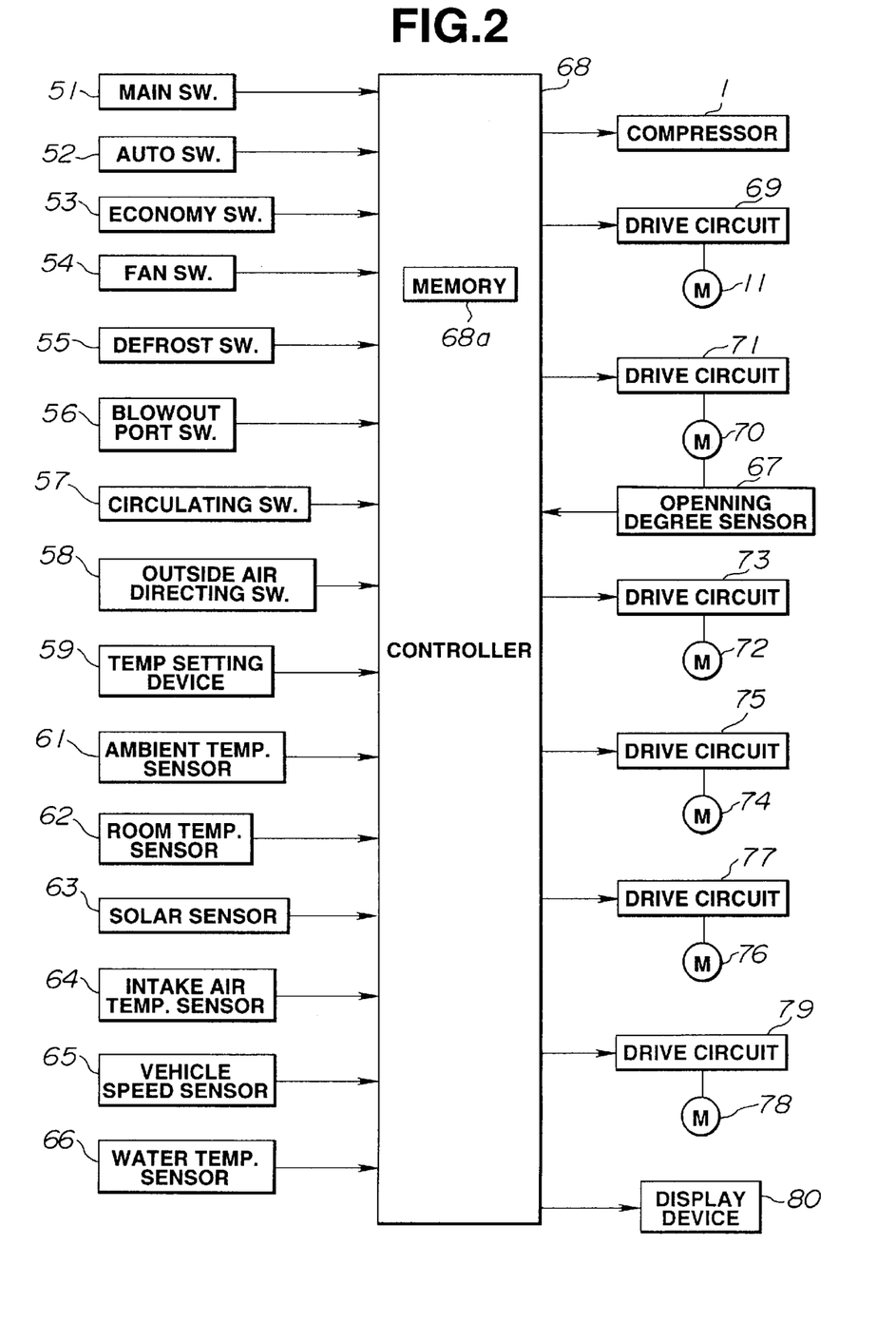
FIG. 2 is a block diagram which shows a control system of the vehicular air-conditioner of the first embodiment.

As shown in FIG. 2, the air conditioner comprises a control system where the controller 68 constituted by a microcomputer is electrically connected with various switches and circuits to execute various control operations. In FIG. 2, 51 denotes a main switch for commanding start and stop of the air conditioner. 52 denotes an auto switch for setting an auto air-conditioning mode. 53 denotes an economy switch for setting an economy mode under which the air conditioning is executed upon stopping the compressor 1. 54 denotes a fan switch for step wise changing the rotation speed of the blower fan 10. 55 denotes a defrost switch for removing the clouding of the window shield. 56 denotes a blowout port switch for selecting one of the blowout ports 15, 16 and 17. By repeatingly depressing the blowout port switch 56, the blowout mode is in turn changed as follows: a vent. blowout mode→a bi-level blowout mode→a foot blowout mode→a defrost blowout mode→the vent. blowout mode. 57 denotes an air circulating switch for executing the air conditioning by circulating the inside air. 58 denotes an outside air directing switch for executing the air condition by directing the outside air to the air conditioner. 59 denotes a temperature setting device for setting the temperature in the passenger compartment.

61 denotes an ambient temperature sensor for detecting an ambient temperature Tamb. 62 denotes a room temperature sensor for detecting a room temperature Tinc in the passenger compartment. 63 denotes a solar sensor for detecting a solar intensity Qsun and is installed to a front grill in the passenger compartment. 64 denotes an intake air temperature sensor for detecting the temperature Tint of the air just passed through the evaporator 6. 66 is a water temperature sensor for detecting a temperature Tw of the coolant of the engine. 67 is an opening degree sensor for detecting the opening degree Xdsc of the air mix door 13.

The controller 68 including a memory 68a executes an air-conditioning control program on the basis of information from the switches 51 to 58, a setting device 59 and sensors 61 to 67. The controller 68 controls the compressor 1, a drive circuit 69 of the blower motor 11, a drive circuit 71 of an air mix door actuator 70, a drive circuit 73 of a ventilator door actuator 72, a drive circuit 75 of a foot door actuator 74, a drive circuit 77 of a defroster door actuator 76, a drive circuit 78 of an intake door actuator 78. A display circuit 80 for displaying switch information as to the set switches is connected to the micro-computer 68.

Figure 3:
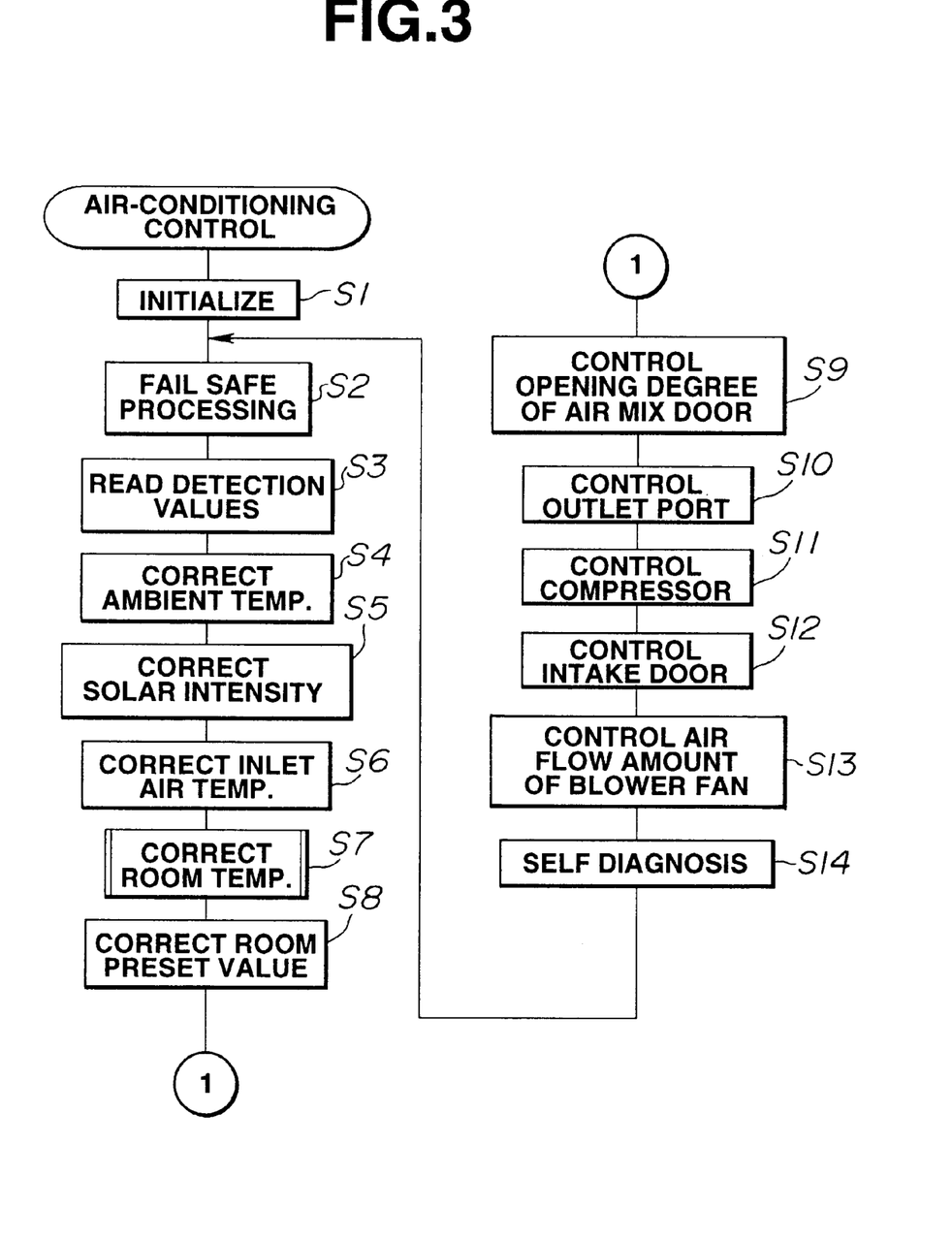
FIG. 3 is a flowchart which shows a program for executing an air conditioned control by a controller of the first embodiment.

The air conditioning control is executed by the controller 68 according to a flowchart shown in FIG. 3. The manner of operation of this air conditioning control will be discussed hereinafter. This air conditioning control starts when the main switch 51 is turned on.

At a step S1, the controller 68 initializes the room temperature set value Tptc, the room temperature Tinc, the ambient temperature Tamb, an intake air temperature Tint, the water temperature Tw, the solar intensity Qsun, the opening degree Xdsc of the air mix door 13, and the switch condition of the switches 51 to 58.

At a step S2, the controller 68 executes a fail safe process, such as a data back-up process in order to meet with the abnormality of the system due to the run-away of the micro-computer.

At a step S3, the controller 68 reads the detection values of the sensors 61 to 67.

At a step S4, the controller 68 executes a correction of the ambient temperature Tamb detected by the ambient temperature sensor 61. Normally, the ambient temperature sensor 61 is attached to a radiator-core support in the engine compartment, and therefore it is possible that the detection value of the ambient temperature sensor 61 may be radically raised up due to the heat from a radiator during the idling condition just after the running of the vehicle. Therefore, the controller 68 executes the correction of the detected ambient temperature Tamb so that the read-in temperature by the controller 68 is slowly raised up.

At a step S5, the controller 68 executes a correction of the solar intensity Qsun detected by the solar sensor 63.

At a step S6, the controller 68 executes a correction of the intake air temperature Tint detected by the intake air temperature sensor 64. Since the intake air temperature sensor 64 is installed to the evaporator 6 whose surface temperature has a predetermined temperature distribution, the detected temperature is influenced by the installed position. Therefore, this correction is executed to solve such deviation.

At a step S7, the controller 68 executes a correction of the room temperature Tinc detected by the room temperature sensor 62 in order to correct the error generated by the installed position.

At a step S8, the controller 68 corrects the room temperature preset value Tptc set at the room temperature setting device 59 by a vehicle occupant. For example, when the ambient temperature Tamb is higher than 20° C., the room temperature set value Tptc is lowered according to the increase of the ambient temperature. Further, when the ambient temperature Tamb is lower than 20° C., the room temperature preset value Tptc is raised up according to the lowering of the ambient temperature Tamb.

At a step S9, the controller 68 calculates a target blowout air temperature Xm on the basis of a correction value T*ptc of the set value of the room temperature, a correction value T*inc of the detected room temperature, a correction value T*am of the ambient temperature, a correction value Q*sun of the solar intensity and the following equation (1).

$$Xm = (A+D) \times T^*\text{ptc} + B \times \text{Tam} + C \times Q^*\text{sun} - D \times \text{Tinc} + E \qquad (1)$$

wherein A, B, C, D and E are constants.

The opening degree of the air mix door is controlled according to the calculated target blowout air temperature Xm.

At a step S10, the control of the blowout ports 15, 16 and 17 is executed. For example, when the auto air-conditioning mode is selected, the opening conditions of the blowout ports 15, 16 and 17 are determined upon taking into consideration the opening degree of the air mix door 13, the detected temperature of the intake air temperature sensor 64, the solar intensity and the like. On the other hand, when the blowout port switch 56 is manipulated, the blowout port is set according to this manipulation.

At a step S11, the controller 68 executes a drive control of the compressor 1 so that the discharge amount determined according to the set blowout port and the ambient temperature.

At a step S12, the controller 68 sends a signal to the drive circuit 79 of the intake door actuator 78 to execute the selection of the outside air inlet port 7a, the inside air inlet port 7b or both by controlling the intake doors 9. For example, when the compressor 1 is operated in the auto air-conditioning mode where a REC switch is turned off, the selection from the outside air, the inside air and the half-and-half air is executed according to the target blowout air temperature Xm.

At a step S13, the controller 68 sends a signal to the drive circuit 69 of the blower motor 11 to execute a control of the air flow amount of the blower fan 19 on the basis of the target blowout air temperature Xm.

At a step S 14, the controller 68 executes a self-diagnosis of the system by executing a diagnosis program (though not shown). When abnormality of the system is detected, a predetermined process is executed, and the routine returns to the step S2.

Figure 4:
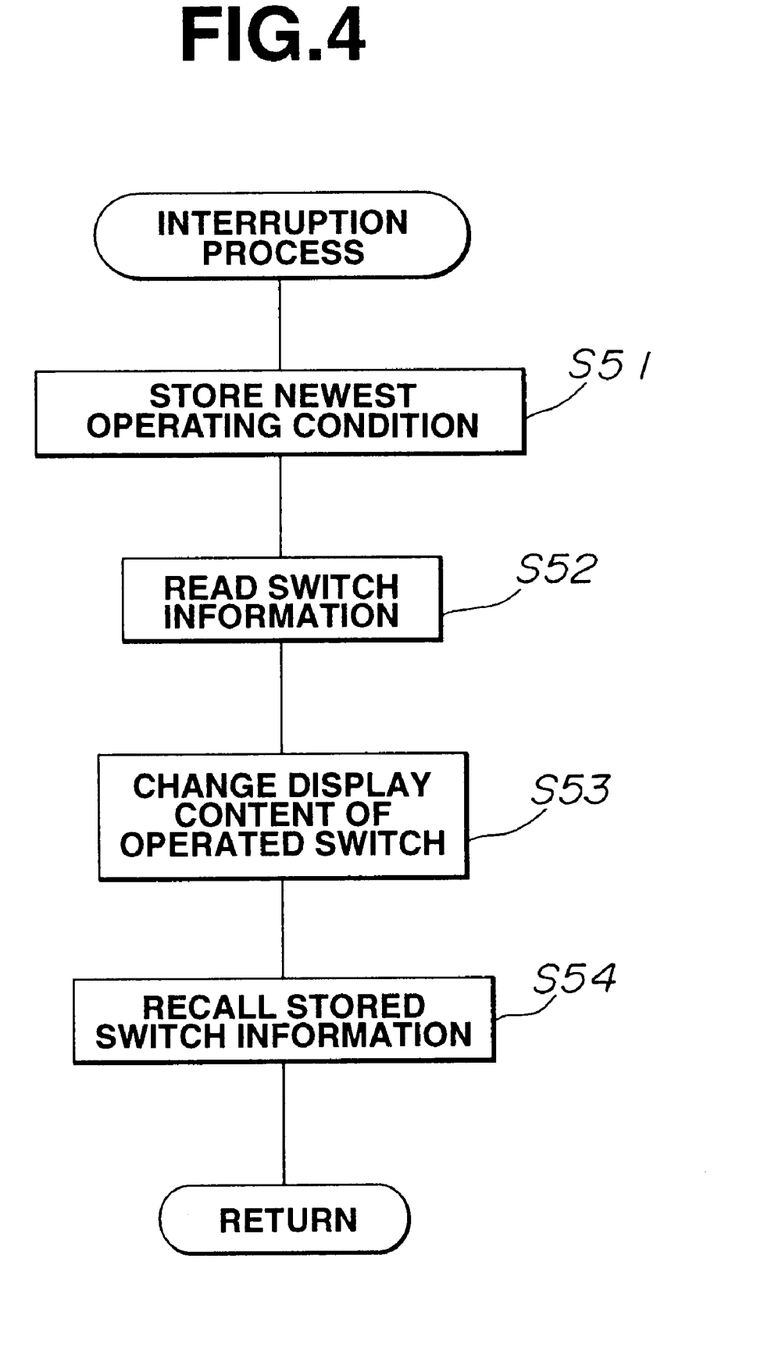
FIG. 4 is a flowchart which shows an interruption process executed by the controller of the air conditioner according to the present invention.

FIG. 4 shows an interruption process executed by the controller when the switches 51 to 58 are controlled At a step S51, the controller 58 stores a newest operating condition of the controller 58 in the memory 68a just before this interruption process. For example, the controller 68 saves the content of a register of the controller 68 into the memory 68a.

At a step S52, the controller 68 reads switch information of the controlled switches 51 to 58.

At a step S53, the controller 68 changes the displayed content of the display device 80 according to the switch information, and executes a process corresponding to the switch information.

At a step S54, the controller 68 returns the information saved in the memory 68a at the step S51 to the register. Then, the routine returns to a main routine of FIG. 3.

Figure 5:
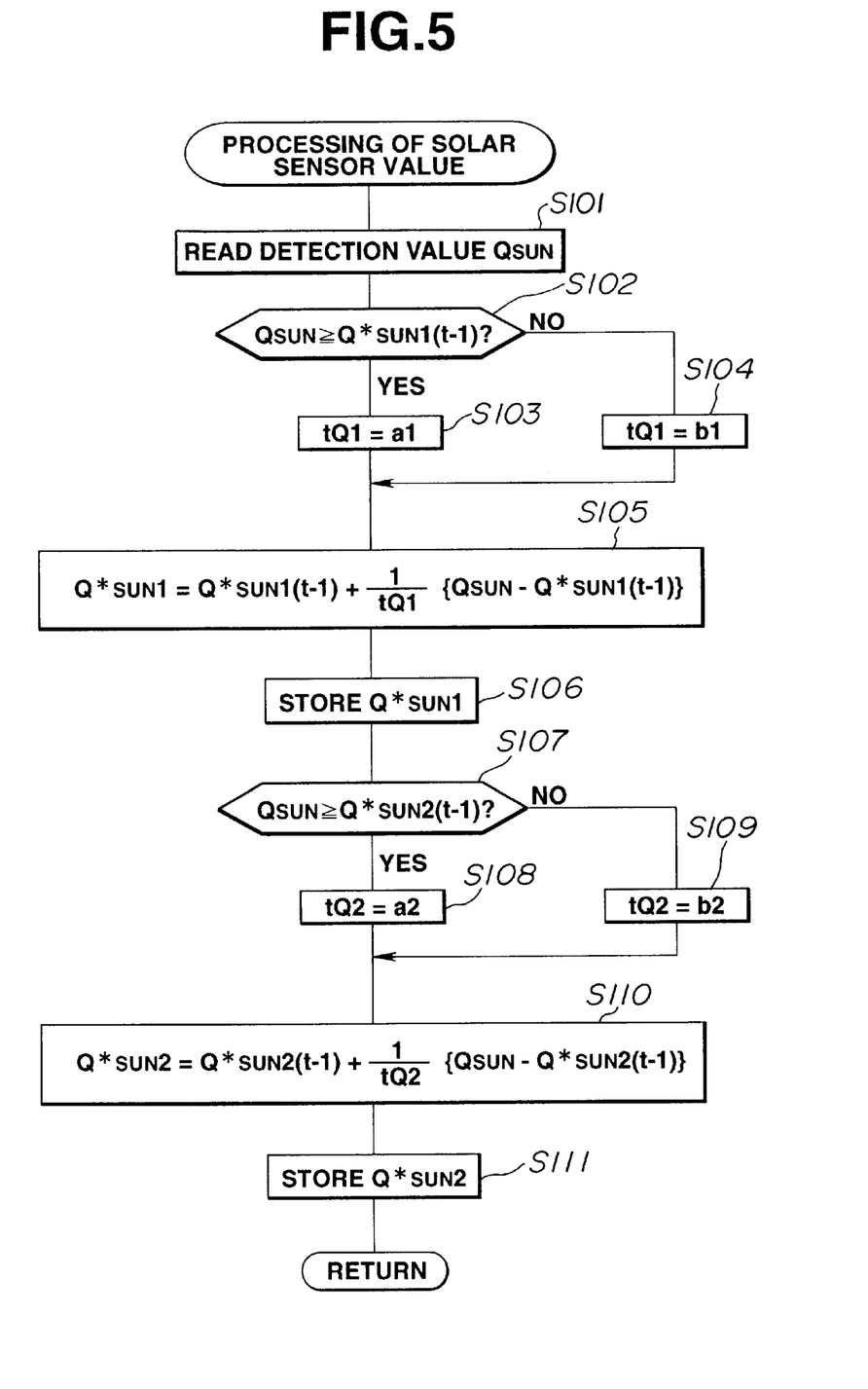
FIG. 5 is a flowchart which shows a detailed process for obtaining the solar sensor value as to the step S5 of FIG. 3.

A flowchart of FIG. 5 shows a detail correction process of the step S5 in FIG. 3 where the correction of the detection value of the solar sensor 63 is executed.

At a step S101, the controller 68 reads a detection value Qsun of the solar intensity detected by the solar sensor 63.

At a step S102, the controller 68 decides as to whether or not the detection value Qsun of the solar intensity is larger than a previous first calculation value Q*sun (t−1) which is stored in the memory 68a. When the decision at the step S102 is "YES", the routine proceeds to a step S103 wherein a value al is assigned to a first coefficient tQ1 used in the first-order lag filtering process. On the other hand, when the decision at the step S102 is "NO", the routine proceeds to a step S104 wherein a value b1, which is larger than the value a1 (a1<b1), is assigned to the coefficient tQ1.

Following to the step S103 or S104, the routine proceeds to a step S105 wherein the controller 68 obtains a first calculation value Q*sun1 of the solar intensity by executing the first-order lag filtering process as to the detection value Qsun of the solar intensity on the basis of the following equation (2).

$$Q^*sun1=Q^*sun1(t-1)+(1/tQ1)\times\{Qsun-Q^*sun1(t-1)\} \quad (2)$$

When the previous first calculation value Q*sun (t−1) is not stored in the memory 68a, such as when the process at the step S105 is a first execution, the detection value Qsun of the solar intensity is set as the first calculation value Q*sun1 of the solar intensity.

Figure 6:
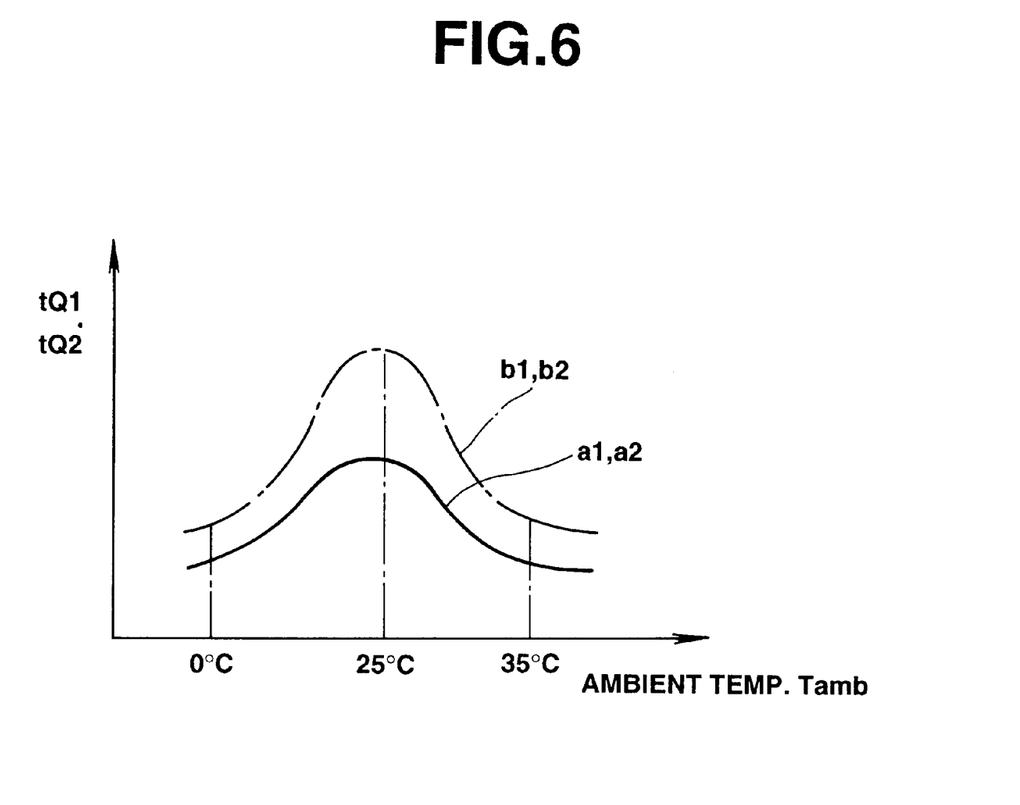
FIG. 6 is a graph which shows changes of coefficient a1, b1, a2 and b2 with respect to the ambient temperature.

The above-mentioned values a1 and b1 are varied according to the ambient temperature as shown in FIG. 6 and take on a small value in the vicinity of the standard temperature of the air conditioner such as 25° C. The smaller these values a1 and b1 become, the smaller the first calculation value Q*sun1 becomes as represented by the equation (2).

The values a1 and b1 are varied in order to change the response speed of the solar intensity according to the ambient temperature. More particularly, when the ambient temperature is close to the standard temperature of the air conditioner such as 25° C., the response speed of the solar intensity is decreased so as not to apply discomfort to vehicle occupants.

At a step S106, the first calculation value Q*sun1 obtained at the step S105 is stored in the memory 68a. That is, the previous first calculation value Q*sun1 (t−1) stored in the memory 68a is substituted by the present first calculation value Q*sun1.

The first calculation value Q*sun1 calculated by the process in the steps S101 to S106 is used in the control of the opening degree of the air mix door 13 executed at the step S9 of FIG. 3.

At a step S107, the controller 68 decides as to whether or not the detection value Qsun of the solar intensity is greater than a previous second calculation value Q*sun2 stored in the memory 68a. When the decision at the step S107 is "YES", the routine proceeds to a step S108 wherein a value a2 is assigned to a second coefficient tQ2 used in the first-order lag filtering process. On the other hand, when the decision at the step S107 is "NO", the routine proceeds to a step S109 wherein a value b2 is assigned to the second coefficient tQ2 wherein the value b2 is larger than the value a2 (a2<b2).

After the execution of the step S108 or S109, the routine proceeds to a step S110 wherein the controller 68 obtains the second calculation value Q*sun2 of the solar intensity by executing the first-order lag filtering process at to the detected value Qsun of the solar intensity on the basis of the following equation (3).

$$Q^*sun2=Q^*sun2(t-1)+(1/tQ2)\times\{Qsun-Q^*sun2(t-1)\} \quad (3)$$

At a step S111, the controller 68 stores the second calculation value Q*sun2 obtained at the step S110 in the memory 68a. The second calculation value Q*sun2 obtained by the process in the steps S107 to S111 is, for example, used in the blowout port control at the step S10 and the air-flow amount control at the step S13 in FIG. 3.

The process for correcting the solar intensity in FIG. 5 is executed such that the coefficient tQ for executing the first-order lag filtering process as to the detected value Qsun of the solar amount detected by the solar sensor 63 is determined by the previous calculation value Q*sun and the ambient temperature Tamb, and such that the corrected calculation value Q*sun of the solar intensity is obtained by executing the first-order lag filtering process upon using the determined coefficient tQ.

Figure 7A:
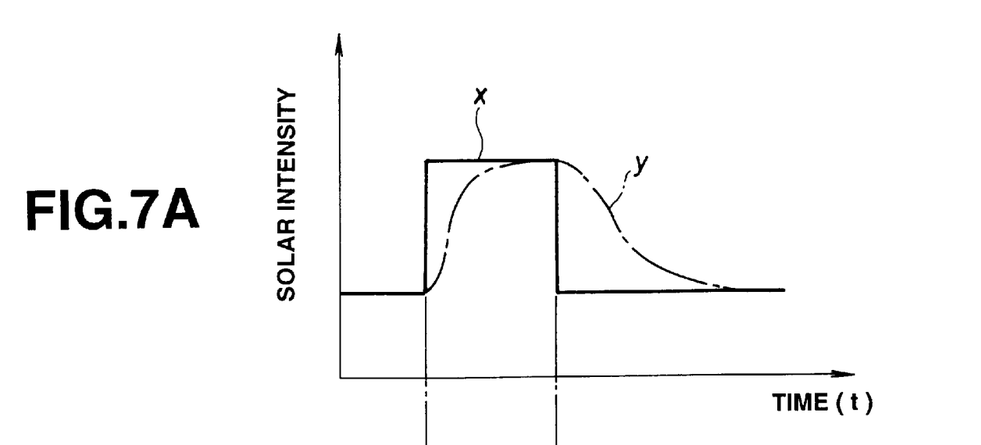
FIGS. 7A and 7B are graphs which shows an operation of an air mix door in relation to a solar intensity.
Figure 7B:
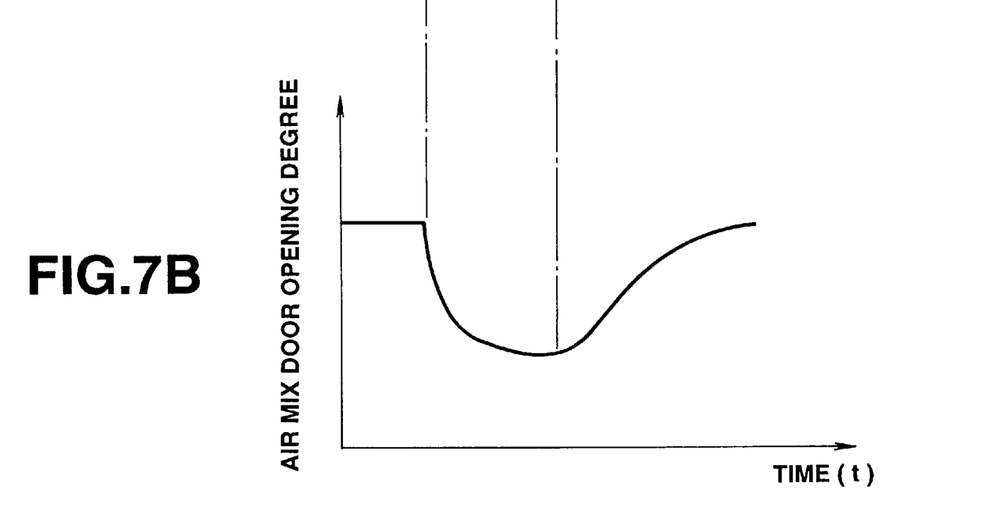

Therefore, even if the detected value of the solar intensity is radically changed, it is possible to adjust the response speed of the calculation value of the solar intensity so as to fit with the feeling of vehicle occupants through their skins. Further, since the calculation value of the solar intensity is corrected by each of the controls, i.e., the opening degree control and the air-flow amount control, the air conditioning is further preferably executed by the air conditioner according to the present invention. For example, when the solar intensity is radically increased as shown by a former part of a continuous line x in FIG. 7A, the opening degree of the air mix door 12 is closed in a relatively high speed as shown in FIG. 7B. On the other hand, when the solar intensity is radically decreased as shown by a later part of the continuous line x in FIG. 7A, the opening degree of the air mix door 12 is slowly opened as shown in FIG. 7B. This enables the opening degree of the air mix door 13 to be changed in correspond with feeling of men through skin shown by a dot and dash line y of FIG. 7A.

Although the first embodiment according to the present invention has been shown and described to change the coefficient tQ for the first-order lag filtering process as shown in FIG. 6, it will be understood that the coefficient tQ may be set at a constant value to facilitate the processes. Further, while the first embodiment has been shown and described to obtain the first calculation value for the opening degree control and the second calculation value for the blowout port control and the air-flow amount control, it will be understood that only one calculation value may be obtained for these controls or a third calculation value may be obtained to separately use the values to the controls, respectively.

Figure 8:
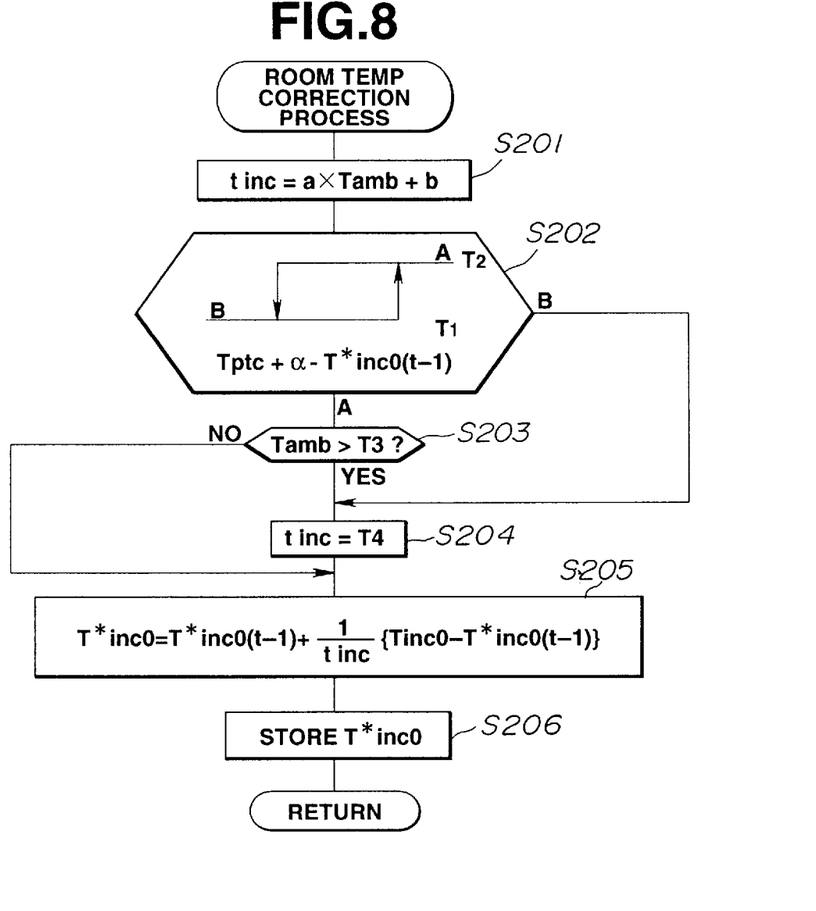
FIG. 8 is a flowchart which shows an interruption process executed by the controller of a second embodiment.
Figure 9:
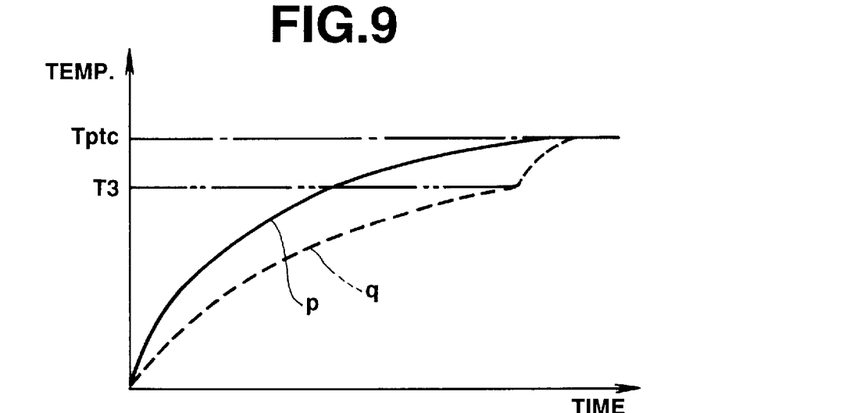
FIG. 9 is a graph which shows changes of average value of the room temperature and the detection value as to time.

Referring to FIGS. 8 and 9, there is shown a second embodiment of the air conditioner according to the present invention. The construction and the air-conditioning control of the second embodiment is the same as those of the first embodiment shown in FIGS. 1 to 3. Therefore, the explanations thereof are omitted herein.

FIG. 8 shows a detailed flowchart for executing a room temperature correcting process at the step S7 of FIG. 3.

First, at a step S201, the controller 68 calculates a coefficient $t_{inc}$ used in the first-order lag filtering process on the basis of the following equation (4).

$$t_{inc} = a \times \text{Tamb} + b \tag{4}$$

wherein Tamb is the ambient temperature, a and b are constants determined by the blowout port mode. More particularly, a is a constant value corresponding to the vent. blowout port 15, and b is a constant value corresponding to the foot blowout port 16.

At a step S202, the controller 68 decides as to whether a room temperature condition is in a condition A or condition B. Such decision is basically executed by obtaining a difference between the corrected set value (Tptc +α) of the room temperature wherein α is a function of the ambient temperature Tamb and a correction value T*inc0(t−1) of the previous detection value detected by the room temperature sensor 62. When the difference is greater than a second predetermined value T2 or is changed from a state that the difference is greater than the second predetermined value T2 to a state that the difference is smaller than the second predetermined value T2 and greater than a first predetermined value T1, the controller 68 decides that the room condition is in the condition A. On the other hand, when the difference is smaller than the first predetermined value T1 or is changed from a state that the difference is smaller than the first predetermined value T1 to a state that the difference is greater than the first predetermined value T1 and smaller than the second predetermined value T2, the controller 68 decides that the room condition is in the condition B. Further, when the difference is smaller than the second predetermined value T2 and greater than the first predetermined value T1 from the start of the engine, the controller 68 decides that the room condition is in the condition A. When the answer at the step S202 is "A", the routine proceeds to a step S203 wherein the controller 68 decides as to whether the ambient temperature Tamb is greater than a third predetermined temperature T3 or not. The third predetermined temperature T3 is set at a temperature lower than the set value Tptc of the room temperature.

When the decision at the step S202 is "B", the routine jumps to a step S204 wherein a fourth predetermined value T4 is assigned to the coefficient $t_{inc}$ used in the first-order lag filtering process. When the decision at the step S203 is "YES", the routine proceeds to the step S204. When the decision at the step S202 is "B" or when the decision at the step S203 is "YES", the coefficient $t_{inc}$ is set at the fourth predetermined value T4 in order to rapidly approach the correction value T*inc0 of the detection value to the set value Tptc of the room temperature.

When the decision at the step S203 is "NO" or when the process at the step S204 is finished, the routine proceeds to a step S205 wherein the controller 68 obtains the correction value T*inc0 of the sensor detection value by executing the first-order lag filtering process as to the detection value $T_{inc}0$ detected by the room temperature sensor 62 on the basis of the following equation (5).

$$T\text{*inc}0 = T\text{*inc}0(t-1) + (1/t_{inc}) \times \{T\text{*inc}0 - T\text{*inc}0(t-1)\} \tag{5}$$

When the previous correction value T*inc0(t−1) is not stored in the memory 68a, for example, when the step S205 is first executed, the correction value T*inc0 of the sensor detection value is set at the sensor detection value Tinc0.

At a step S206, the controller 68 stores the correction value T*inc0 calculated at the step S205 into the memory 68a. That is, the previous correction value T*inc0 (t−1) is replaced by the present correction value T*inc0. The correction value T*inc0 obtained in the steps S201 to S205 is used at the step S9 of FIG. 3 to calculate the target blowout air temperature Xm.

The process of FIG. 8 is executed to obtain the correction value T*inc0 of the detection value of the room temperature by executing the first-order lag filtering process as to the sensor detection value Tinc0. More particularly, the coefficient $t_{inc}$ used in the first-order lag filtering process is determined on the basis of the previous correction value T*inc0(t−1) and the set value Tptc of the room temperature, more particularly, (Tptc +α). When the difference between the set value Tptc of the room temperature and the correction value T*inc0 is greater than a predetermined value, the correction value T*inc0 is slowly changed so as to fit with the feeling through skins of the vehicle occupants. When the difference between the set value Tptc and the correction value T*inc0 becomes smaller than the predetermined value, the correction value T*inc0 is rapidly approached to the preset value as shown in FIG. 9.

With the thus arranged control, the actual room temperature is changed or adjusted so as to fit with the feeling through skins of the vehicle occupants. This improves the amenity of the vehicle occupants. Further, it becomes possible to rapidly change or adjust the room temperature to a target temperature set by the vehicle occupant.

Although the second embodiment of the present invention has been shown and described such that the coefficient $t_{inc}$ used in the first-order lag filtering process is determined on the basis of the ambient temperature, it will be understood that the coefficient tinc may be determined upon taking into consideration the outputs of the room temperature sensor 62 and the solar sensor 63 and the like. Further, the coefficient $t_{inc}$ may be changed according to the air conditioning state such as the selected blowout port mode and the voltage applied to the blower fan.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An air conditioner for a vehicle, comprising:
   a detecting means for detecting a quantity of a parameter which affects an air-conditioned state of a passenger compartment in a vehicle;
   a correcting means for correcting the detected parameter by executing a first-order lag filtering process to the detected parameter to produce a corrected parameter to take into account the passenger's delayed reaction to the detected parameter; and
   a control system for controlling cooling on the basis of the corrected parameter.

2. An air conditioner for a vehicle as claimed in claim 1, wherein said detecting means includes at least one of a solar sensor and a room temperature sensor.

3. An air conditioner as claimed in claim 1, wherein said correcting means comprises a memory which stores the corrected parameter, said correcting means correcting the detected parameter on the basis of a difference between the corrected parameter stored in the memory and the detected parameter, said correcting means executing the first-order lag process of the detected parameter when the difference becomes greater than a predetermined value.

4. An air conditioner as claimed in claim 3, wherein said correcting means comprises a coefficient setting means which determines the coefficient value according to a relationship between magnitudes of the detected parameter and the stored parameter, said correcting means correcting the detected parameter on the basis of the difference, the coefficient and the stored parameter.

5. An air conditioner as claimed in claim 4, wherein said coefficient setting means sets a coefficient for each of a plurality of air-conditioning controls which includes at least one of an opening degree control of an air mix door, an air-flow amount control of a blower fan and a blowout port control.

6. An air conditioner as claimed in claim 4, wherein said coefficient setting means sets a coefficient for each of a plurality of air-conditioning controls which includes at least one of an opening degree control of an air mix door, an air-flow amount control of a blower fan and a blowout port control.

7. An air conditioner as claimed in claim 4, wherein said coefficient setting means changes the coefficient according to the ambient temperature.

8. An air conditioner as claimed in claim 4, wherein said correcting means comprises a first-order lag filtering process means, said coefficient setting means setting the coefficient of the first-order filtering process means.

9. An air conditioner for a vehicle, comprising:
   a solar sensor for detecting a solar intensity;
   a correcting means for correcting the detected solar intensity by executing a first-order lag filtering process to the detected solar intensity to produce a corrected parameter to take into account the passenger's delayed reaction to the detected parameter; and
   a control system for controlling cooling on the basis of the corrected solar intensity.

10. An air conditioner as claimed in claim 9, wherein said correcting means comprises a memory which stores the corrected solar intensity, said correcting means correcting the detected solar intensity on the basis of a difference between the corrected solar intensity stored in the memory and the detected solar intensity, said correcting means executing said first-order lag process of the detected solar intensity when the difference becomes greater than a predetermined value.

11. An air conditioner as claimed in claim 10 wherein said correcting means comprises a coefficient setting means which determines the coefficient value according to a relationship between magnitudes of the detected solar intensity and the stored solar intensity, said correcting means correcting the detected solar intensity on the basis of the difference, the coefficient and the stored solar intensity.

12. An air conditioner as claimed in claim 11, wherein said coefficient setting means changes the coefficient according to the ambient temperature.

13. An air conditioner as claimed in claim 11, wherein said correcting means comprises a filtering process means, said coefficient setting means setting the coefficient of the filtering process means.

14. An air conditioning system comprising:
   a sensor; and
   a control unit receiving a signal representative of a reading by the sensor, correcting the sensor reading by a lag filtering process based on pre-set coefficients, and executing an air conditioning control on the basis of the corrected sensor reading.

15. An air conditioning system as claimed in claim 14, wherein the sensor comprises a solar intensity sensor, and wherein the coefficients are pre-set so that the response of the air conditioning system to changes in the solar intensity closely corresponds to a person's sensory response to changes in the solar intensity.

16. An air conditioning system as claimed in claim 15, further comprising a controlled element responsive to control signals from the control unit, wherein the controlled element responds at a first rate when the solar intensity is increased and at a second rate, distinct from the first rate, when the solar intensity is decreased.

17. An air conditioning system as claimed in claim 16, wherein the controlled element includes one or more of an air mix door, a blower fan, and a blowout port.

18. An air conditioning system as claimed in claim 14, wherein the coefficients are pre-set in accordance with an ambient temperature.

19. An air conditioner for a vehicle, comprising:
   a solar intensity sensor for detecting a solar intensity; and
   a control unit for receiving a signal indicative of the solar intensity, correcting the solar intensity by a lag filtering process to take into account the passenger's delayed reaction to the detected parameter, and controlling cooling on the basis of the corrected solar intensity.

20. An air conditioner as claimed in claim 19, wherein said control unit repeatedly corrects the solar intensity by the lag filtering process and stores the corrected solar intensity in a memory.

21. An air conditioner as claimed in claim 20, wherein said control unit corrects the solar intensity by executing the lag filtering process on the basis of the detected solar intensity and the stored corrected solar intensity.

* * * * *